United States Patent
Wu et al.

(10) Patent No.: US 7,347,920 B2
(45) Date of Patent: *Mar. 25, 2008

(54) PRODUCTION, REFINING AND RECYCLING OF LIGHTWEIGHT AND REACTIVE METALS IN IONIC LIQUIDS

(75) Inventors: Banqiu Wu, Tuscaloosa, AL (US); Ramana G. Reddy, Tuscaloosa, AL (US); Robin D. Rogers, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 600 days.

This patent is subject to a terminal disclaimer.

(21) Appl. No.: 10/888,586

(22) Filed: Jul. 12, 2004

(65) Prior Publication Data
US 2004/0238352 A1  Dec. 2, 2004

Related U.S. Application Data

(62) Division of application No. 09/982,190, filed on Oct. 19, 2001, now Pat. No. 6,881,321.

(60) Provisional application No. 60/241,797, filed on Oct. 20, 2000.

(51) Int. Cl.
*C25D 9/00* (2006.01)

(52) U.S. Cl. .................. 204/243.1; 204/242; 204/287; 205/348

(58) Field of Classification Search ............... 205/348; 204/242, 243.1, 287
See application file for complete search history.

(56) References Cited

U.S. PATENT DOCUMENTS

| | | | |
|---|---|---|---|
| 2,446,331 A * | 8/1948 | Hurley ..................... 205/233 |
| 2,446,349 A | 8/1948 | Wier et al. |
| 2,446,350 A | 8/1948 | Wier |
| 4,226,685 A * | 10/1980 | Portal et al. ............... 205/348 |
| 4,624,753 A | 11/1986 | McManis, III et al. |
| 4,624,754 A | 11/1986 | McManis, III et al. |
| 4,624,755 A | 11/1986 | McManis, III et al. |
| 5,552,241 A | 9/1996 | Mamantor et al. |
| 5,731,101 A | 3/1998 | Sherif et al. |
| 5,855,809 A * | 1/1999 | Angell et al. ............... 252/62.2 |
| 6,322,684 B1 * | 11/2001 | Hodko et al. ............... 205/125 |
| 6,468,495 B1 * | 10/2002 | Fields et al. ............. 423/499.1 |
| 6,586,166 B1 * | 7/2003 | Olson et al. ............... 430/350 |
| 6,881,321 B2 | 4/2005 | Wu et al. |

* cited by examiner

*Primary Examiner*—Susy Tsang-Foster
*Assistant Examiner*—William T. Leader
(74) *Attorney, Agent, or Firm*—Needle & Rosenberg, PC

(57) ABSTRACT

Lightweight and reactive metals can be produced from ore, refined from alloy, and recycled from metal matrix composites using electrolysis in electrolytes including an ionic liquid containing a metal chloride at or near room temperature. Low electric energy consumption and pollutant emission, easy operation and low production costs are achieved.

10 Claims, 9 Drawing Sheets

PRODUCTION, REFINING AND RECYCLING OF LIGHTWEIGHT AND REACTIVE METALS IN IONIC LIQUIDS

The present application is a Divisional of U.S. Ser. No. 09/982,190, filed Oct. 19, 2001, now U.S. Pat. No. 6,881,321 issued Apr. 19, 2005, and claims benefit of the filing date of U.S. Provisional application Ser. No. 60/241,797, filed Oct. 20, 2000, the entire contents of which are hereby incorporated by reference.

The U.S. Government has a paid-up license in this invention and the right in limited circumstances to require the patent owner to license others on reasonable terms as provided for by the terms of Grant No. NSF-EPS-9977239 awarded by the National Science Foundation.

BACKGROUND OF THE INVENTION

1. Field of the Invention

This invention relates to the production and purification of metals. In particular, this invention relates to production (extraction) from ore, refining from metal alloy, and recycling from metal matrix composites, of lightweight and reactive metallic elements using electrolysis in electrolytes at or near room temperature.

2. Description of the Related Art

Conventional production, refining and recycling of lightweight and reactive metallic elements involves high temperature electrolysis in molten salts. Aluminum provides an illustrative example.

For the past century, primary aluminum has been produced using the Bayer-Hall-Heroult process, which involves high temperature electrolysis of alumina dissolved in molten cryolite ($Na_3AlF_6$). Current aluminum refining also uses high temperature electrolysis.

However, conventional high temperature electrolysis processes require the use of many expensive refractory materials. In addition, conventional high temperature processes consume large amounts of energy. Current high temperature refining of primary and recycled aluminum uses three-layer electrolysis with even higher energy consumption than primary aluminum production. High temperature electrolysis processes also produce large amounts of pollutants. $CF_4$ gas formed in current industrial processes has an extremely long atmospheric residence time and a very high "global warming potential" (about 5100 times higher than $CO_2$). Thus, high temperature electrolysis processes have several disadvantages, including the use of expensive refractory and electrode materials, high production costs and high pollutant emission.

To overcome these disadvantages, electrodeposition processes at or near room temperature have been explored.

U.S. Pat. Nos. 2,446,331; 2,446,349 and 2,446,350 disclose room temperature electrodeposition of aluminum from a molten electrolyte consisting of an aluminum salt, such as aluminum chloride, and an ionic liquid of a N-alkyl pyridinium halide, such as ethyl pyridinium chloride. However, the ethyl pyridinium chloride has the disadvantage of dissolving deposited aluminum and decreasing current efficiency.

U.S. Pat. Nos. 4,624,753; 4,624,754; and 4,624,755 also disclose room temperature electrodeposition of metals, using as ionic liquids non-aqueous nitrate-amide melts to electrodeposit metals such as Fe, Ni, Zn, Ag, Pb and Cu. However, the "electrochemical window" (i.e., difference between the lower and upper voltage limits for electrodeposition) of the nitrate-amide ionic liquids is not high enough for the electrodeposition of aluminum.

U.S. Pat. No. 5,552,241 discloses low temperature molten salt compositions comprised of a mixture of a metal halide, such as aluminum trichloride, and fluoropyrazolium salt.

U.S. Pat. No. 5,731,101 discloses a low temperature molten composition comprising a mixture of a metal halide and an alkyl-containing amine hydrohalide salt.

U.S. Pat. No. 5,855,809 discloses electrolytes, which do not crystallize at ambient temperature, formed by the reaction of a strong Lewis acid, such as $AlCl_3$, with an inorganic halide-donating molecule.

Although room temperature production and refining processes have met with some success, the recycling of aluminum from composites of refractory particles in a matrix of aluminum alloy is much more difficult technologically. Aluminum alloy composites are finding increasing application. For example, discontinuously reinforced aluminum ("DRA") composites are finding extensive use in the automotive industry. However, when DRA is re-melted along with regular aluminum alloy, the recycled product is very difficult to be fabricate because of the very high hardness resulting from the presence of refractory reinforced particles, such as silicon carbide. To separate the refractory particles from the aluminum alloy, it is common to filter the particles from a melt of the recycled product. However, high temperature filtration processes are very difficult to perform.

Because of the difficulties encountered in conventional processes, there is a need for improved methods of producing, refining and recycling lightweight and reactive metallic elements.

SUMMARY OF THE INVENTION

The present invention provides methods and an apparatus for producing and/or purifying a lightweight and reactive metallic element by electrolysis at or near room temperature using an electrolyte including an ionic liquid containing a chloride of the metallic element.

To produce (extract) the metallic element from ore, the ore is first reacted with chlorine to form a gas of a chloride of the metallic element. After purification, the chloride of the metallic element is mixed with an ionic liquid to form an electrolyte that is a liquid at or near room temperature. Electrolysis using the electrolyte deposits the metallic element on a cathode. Chlorine gas released during the electrolysis is recycled to react with more ore.

To purify a metallic element found in metal alloy and metal matrix composite, an anode is first formed from the alloy or composite. The anode is placed, along with a cathode, in an electrolyte of an ionic liquid containing a chloride of the metallic element. Electrolysis at or near room temperature dissolves the metallic element from the anode into the electrolyte and deposits the metallic element on the cathode. No chlorine is released. Impurity atoms and refractory particles remain at the anode or fall to the bottom of the electrolyte.

An ionic liquid made of 1-butyl-3-methylimidazolium chloride and metal chloride has been found to be particularly suitable in electrolytes for electrodeposition at or near room temperature of lightweight and reactive metallic elements.

An apparatus for refining and recycling a metallic element includes an electrolysis cell with a packed bed cathode including a porous metal basket filled with conductive particles. The large cathodic surface area provided by the conductive particles speeds electrodeposition of the metallic element.

The present invention provides advantages over current metal production processes in terms of reduced cost and pollutant emission. In the production of Al, for example, the present invention can reduce electrical energy costs about 35%, prevent some gaseous pollutant emissions (e.g. CO and $CF_4$), and reduce solid wastes (e.g. aluminum dross).

DETAILED DESCRIPTION OF THE PREFERRED EMBODIMENTS

According to the present invention, a lightweight and reactive metallic element can be produced from an ore containing the metallic element. The metallic element can also be purified by refining the metallic element from metal alloy containing the metallic element, and by recycling the metallic element from metal matrix composite containing refractory particles dispersed in a matrix of the metallic element.

The metallic elements that can be produced or purified according to the present invention include Li, Mg, Al, Ti, Zr and Nd. Preferably, the metallic element is Al.

The production and purification processes involve electrolysis at or near room temperature. As is well known in the art, electrolysis involves application of a voltage across an anode and a cathode inserted into an electrolyte. In the present invention, the voltage is in a range of 0 to 4 volts, preferably 1 to 3.5 volts. The electrolyte is at a temperature from 0° C. to 200° C., preferably from 25° C. to 150° C. The electrolyte is an ionic liquid containing a chloride of the metallic element being produced or purified. The molar ratio of the chloride of the metallic element to the other ionic liquid component (e.g., other chloride) is in a range from 1 to 2, preferably 1.3 to 1.7. The ionic liquid is an organic chloride salt. Preferably, the ionic liquid is made by mixing $AlCl_3$ and 1-butyl-3-methylimidazolium chloride ("BmimCl"), BmimCl is given by the following formula:

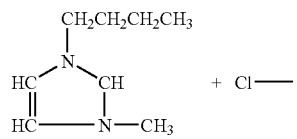

Metal Production from Ore

Figure 1:
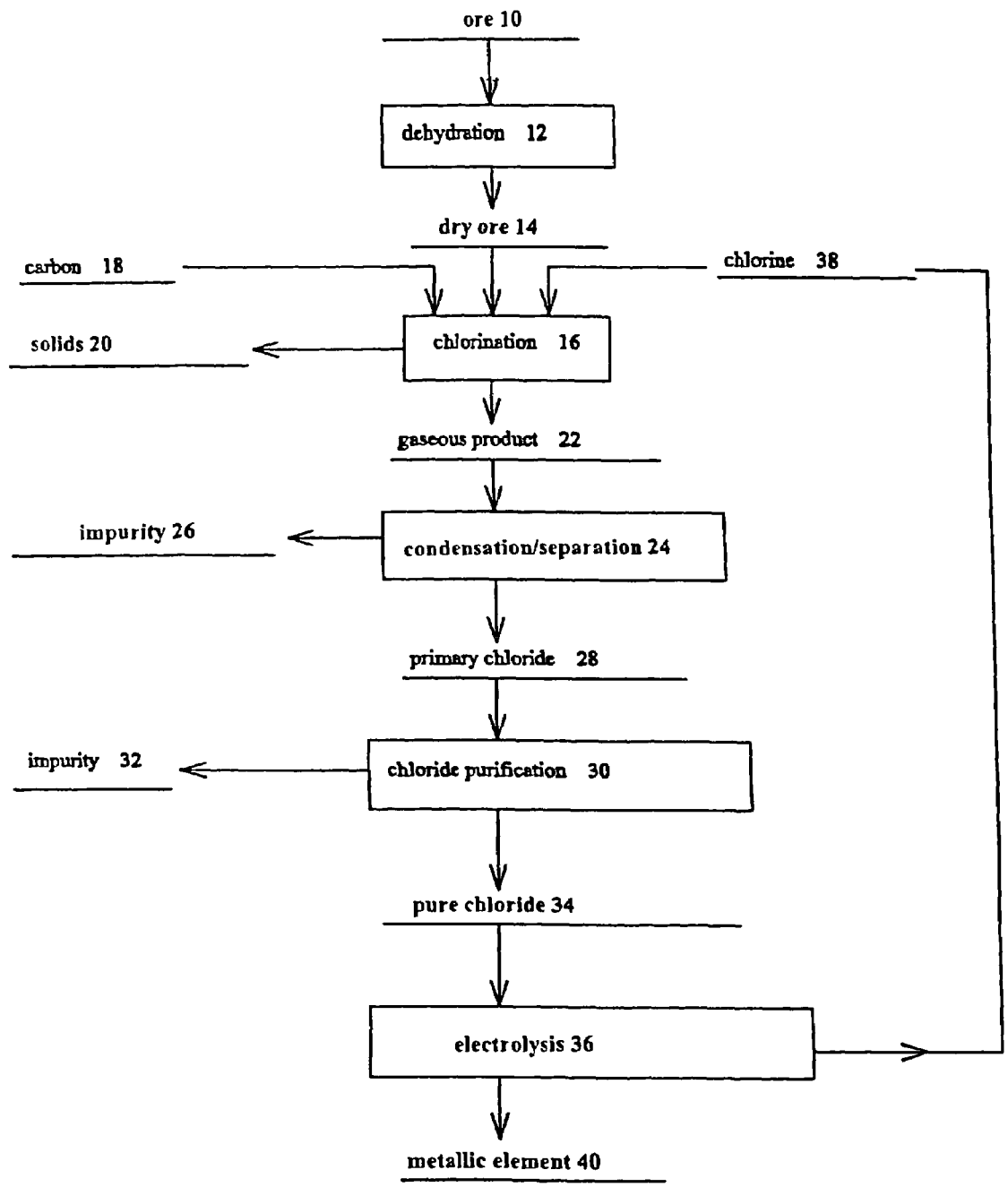
FIG. 1 is a flow chart showing a metal production (extraction) process.

FIG. 1 illustrates an embodiment of the present invention in which a metallic element is produced (extracted) from ore. Ore 10 undergoes dehydration 12 to form a dry ore 14. The dry ore 14 is reacted with carbon 18 and recycled chlorine gas product 38 in a chlorination process 16 to form a chloride of the metallic element as gaseous product 22. This can be accomplished by, e.g., passing recycled chlorine gas product 38 through a fluidized bed containing the carbon 18 and the dry ore 14. To ensure that the chloride of the metallic element is in gaseous form, it may be necessary to also provide heat (not shown) to chlorination process 16. Solids 20 remaining after chlorination process 16 are removed for disposal. Gaseous product 22 undergoes condensation/separation process 24 in which impurities 26 are separated leaving primary chloride 28. Primary chloride 28 can be further purified in chloride purification process 30, which separates impurity 32 from pure chloride 34. An example of chloride purification process 30 during extraction of Al from bauxite ore includes the removal of $FeCl_3$. Impurities 26 and 32 may require further treatment before release to the environment. Electrolysis 36 of an electrolyte including an ionic liquid containing pure chloride 34 electrodeposits metallic element 40 on a cathode and releases a chlorine gas product as chlorine 38, which is recycled to chlorination process 16.

Preferably the ore 10 is bauxite and the metallic element to be extracted from the bauxite is Al. In this embodiment, chlorination process 16 can be described by the equation

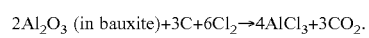

$2Al_2O_3$ (in bauxite)$+3C+6Cl_2 \rightarrow 4AlCl_3+3CO_2$.

In this embodiment, the gaseous product 22 is $AlCl_3$. Because $AlCl_3$ readily sublimes at 178° C., large amounts of heat will not have to be added to the chlorination process 16 to form the gaseous product 22. The subsequent electrolysis process 36 can be described by the equation

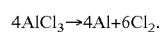

$4AlCl_3 \rightarrow 4Al+6Cl_2$.

Thus, chlorination process 16 can consume all of the chlorine gas product released in electrolysis process 36. In practice some chlorine gas product may be lost during recycle, and additional chlorine gas, not shown in FIG. 1, may be necessary to replace the lost chlorine gas product. However, preferably more than 80% of the chlorine gas product released during electrolysis process 36 is recycled back to chlorination process 16.

Metal Purification (Refining and Recycling)

Figure 2:
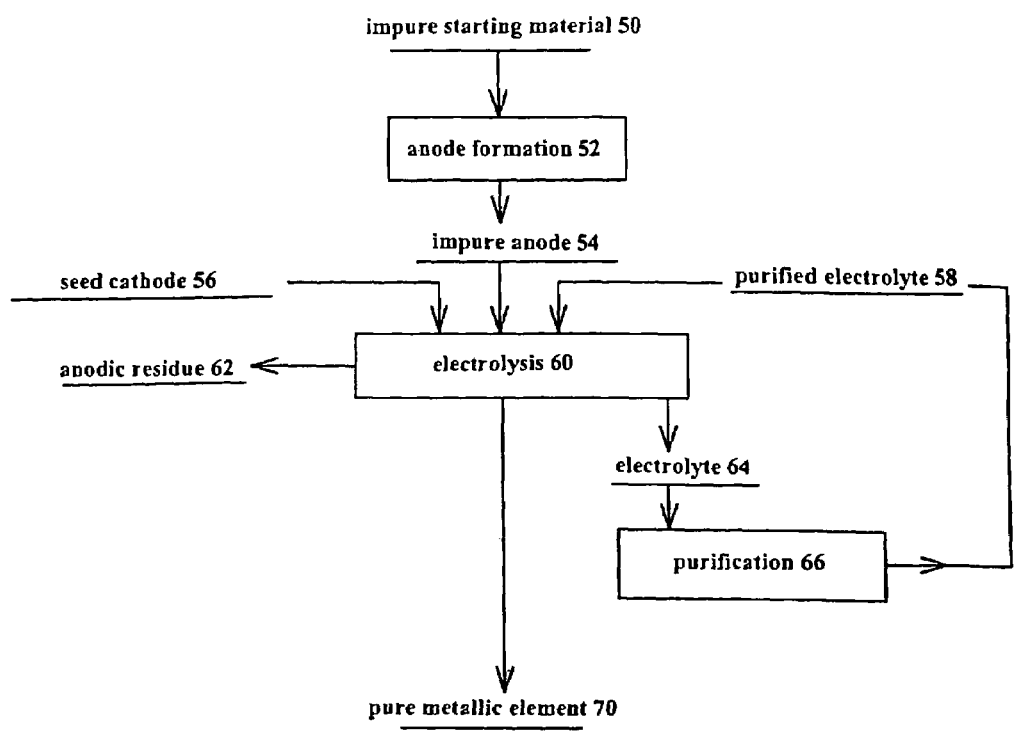
FIG. 2 is a flow chart showing a metal purification process.

FIG. 2 shows an embodiment of the present invention in which an impure starting material 50 first undergoes anode formation 52 to form an impure anode 54. The impure starting material 50 is electrically conductive and contains a metallic element to be purified. In an metal refining process, the impure starting material 50 can be an alloy of the metallic element. In a metal recycling process, the impure starting material 50 can be a metal matrix composite of refractory particles dispersed in a matrix of the metallic element. The refractory particles can be ceramic particles. Preferably, the refractory particles are borides, such as $TiB_2$; carbides, such as SiC; nitrides, such as $Si_3N_4$ and AlN; or oxides, such as $Al_2O_3$, of metallic and/or non-metallic elements. Electrolysis 60 of the impure anode 54 in an electrolysis cell containing an ionic liquid that includes a chloride of the metallic element results in electrodeposition of pure metallic element 70 on a seed cathode 56. The pure metallic element 70 and seed cathode 56 product can be melted and cast in a further process (not shown).

Anodic residue 62, which includes both undissolved anode material and any precipitate on the bottom of the electrolysis cell, is removed for further treatment. The undissolved anode material can be re-melted (not shown) to form another anode. The precipitate can be further processed (not shown) to recover metals other than metallic element 70 and other valuable materials.

After prolonged electrolysis, dissolved impurities can accumulate in the electrolyte and lead to a decrease in the purity of the electrodeposited metallic element 70. To avoid this decrease in purity, electrolyte 64 undergoes purification 66, and the resulting purified electrolyte 58 is recycled to the electrolysis cell.

Apparatus for Metal Purification

Figure 3:
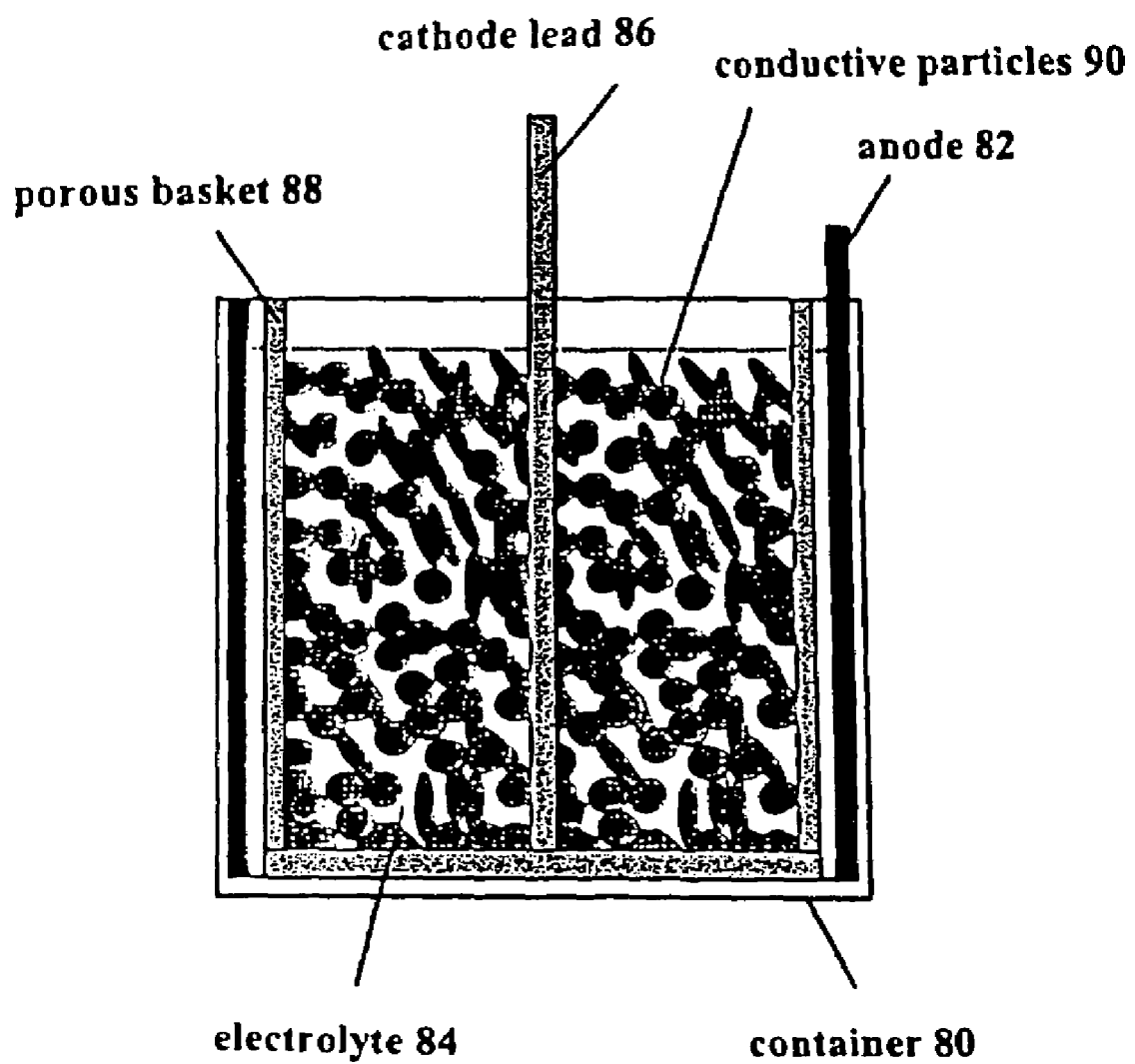
FIG. 3 shows a metal purification apparatus.

FIG. 3 shows an metal purification apparatus according to the present invention that can be used for refining and recycling lightweight and reactive metallic elements. The metal purification apparatus serves as an electrolysis cell. Container 80 is an electrically insulating material, such as a polymer or a ceramic, that can withstand temperatures of at least 200° C. Container 80 supports impure anode 82, electrolyte 84 and a packed bed cathode. In refining processes, impure anode 82 includes an metal alloy containing a metallic element being purified. In recycling processes, impure anode 82 includes a metal matrix composite containing the metallic element being purified. Electrolyte 84 is an ionic liquid containing a chloride of the metallic element to be extracted or purified. The packed bed cathode fits inside the anode 82. The packed bed cathode includes cathode lead 86 for making electrical contact to porous basket 88 containing electrically conductive particles 90. Cathode lead 86 and porous basket 88 are metal, and are preferably formed of the metal being electrodeposited, e.g., Al. Alternatively, cathode lead 86 and porous basket 88 can be formed of stainless steel or copper. The conductive particles 90 are in electrical contact with the cathode lead 86 and porous basket 88. Porous basket 88 is a mesh or perforated sheet porous enough to allow electrolyte 84 and dissolved material from anode 82 to circulate in the electrolysis cell, thus improving mass transport and preventing concentration polarization. Conductive particles 90 can be of any electrically conductive material, e.g., carbon, and are sufficiently large not to slip through porous basket 88. Preferably, the conductive particles 90 do not form a thick insulating oxide when exposed to air. Because the conductive particles present more surface area than a traditional plate cathode, the packed bed cathode of the present invention is particularly suited for slow electrodeposition processes and for dilute electrolyte electrolysis.

After electrodeposition of a metallic element on the packed bed cathode, the entire packed cathode can be lifted out of the electrolysis cell. The electrodeposited metallic element can then be separated, if desired, from the conductive particles 90, porous basket 88 and cathode lead 86.

EXAMPLES

Example 1

Production of Al from Alumina

Figure 4:
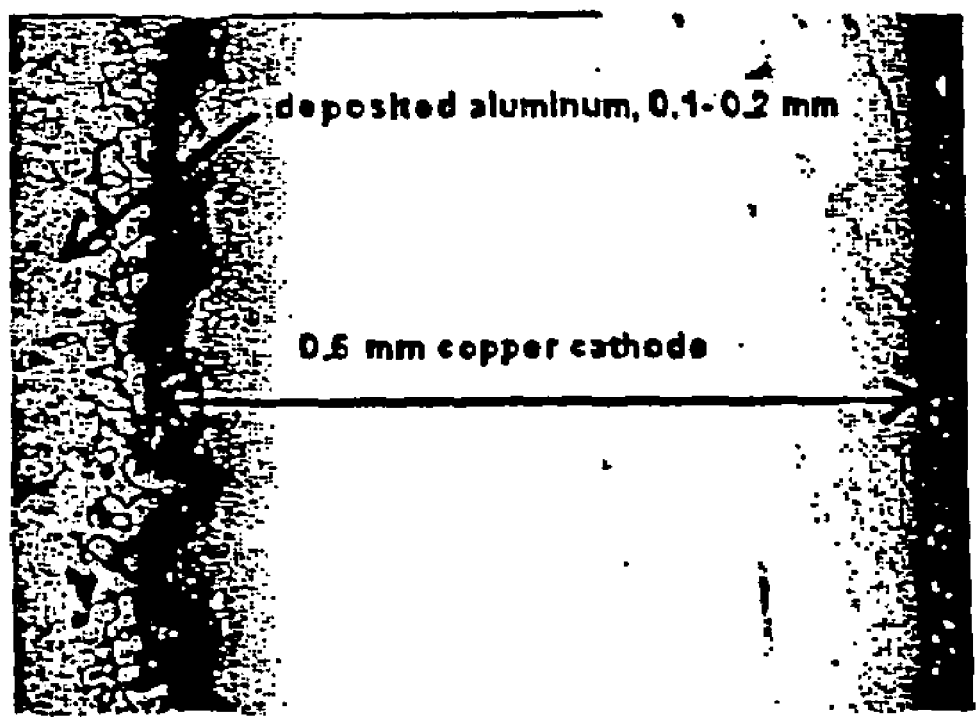
FIG. 4 shows Al extracted from ore after being electrodeposited on a copper cathode.
Figure 5:
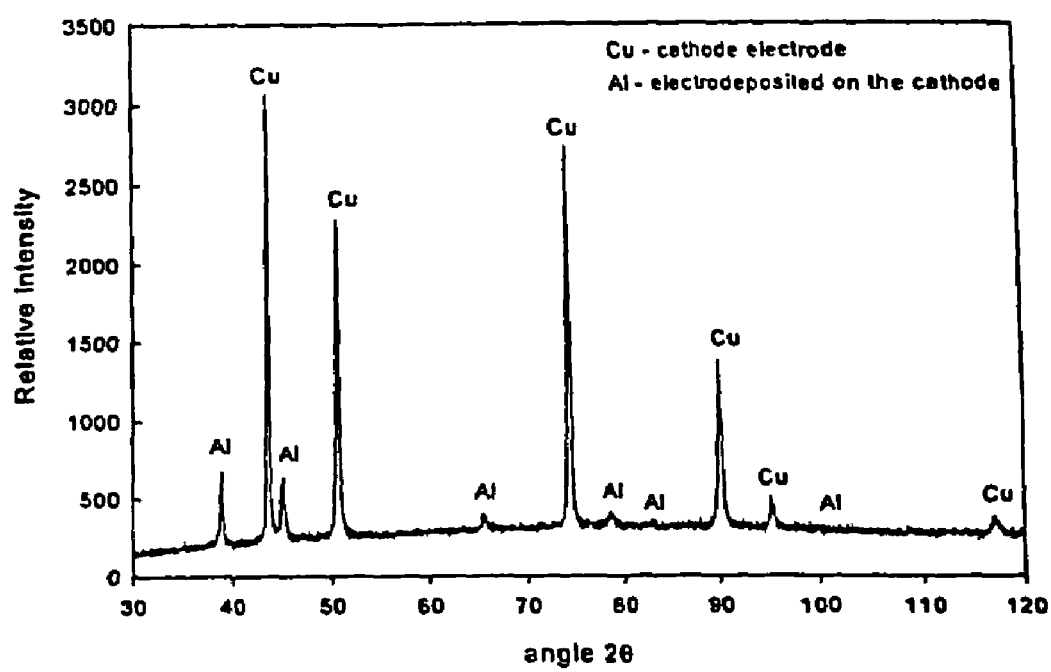
FIG. 5 is an X-ray diffraction pattern of a copper cathode covered with electrodeposited Al extracted from ore.

To extract aluminum from alumina, a mixture of alumina powder and graphite powder is first prepared. The mixture is heated above 200° C. $Cl_2$ gas is passed through a fluidized bed of the hot mixture producing $AlCl_3$ and $CO_2$ gases. The $AlCl_3$ gas is condensed and purified. An electrolyte containing the purified $AlCl_3$ and BmimCl in a molar ratio of $AlCl_3$ to BmimCl of 1.5 is prepared. A copper anode and a copper cathode are introduced into the electrolyte. The electrolyte is maintained at a temperature of 105° C. Application of a voltage of 3.0-3.4 V across the anode and cathode causes Al to electrodeposit on the cathode. FIG. 4 shows the Al deposited on the copper cathode. FIG. 5 shows an X-ray diffraction pattern of the copper cathode with the Al deposit.

Current industrial production of Al is by electrolysis of alumina dissolved in molten cryolite ($Na_3AlF_6$). The electrolytic cells operate at around 1000° C. Table I compares typical experimental conditions for electrodeposition of Al according to the present invention with typical conditions found in current industrial processes. In contrast to the 1000° C. temperatures necessary in the industrial processes, the present invention can electrodeposit Al at 105° C. In addition, while typical industrial processes emit sizeable amounts of CO and $CF_4$ pollutants, the present invention produces no CO or $CF_4$.

TABLE 1

Comparison of typical experimental conditions for extracting Al from alumina

| Parameters | Electrolysis in present invention | Electrolysis in current industrial practice |
| --- | --- | --- |
| Cell voltage, V | 3.0-3.4 | 4.2-5.0 |
| Energy consumption, Kwh/lb | 4.3-4.8 | 6.0-8.5 |
| Current density, $A/m^2$ | 400-800 | — |
| Electrode distance, mm | 20 | 100 |
| Temperature, ° C. | 105 | 1000 |
| Electrode area, $cm^2$ | 2 | — |
| Al deposition thickness, mm | 0.1-0.2 | — |
| CO emission, kg/ton-Al | 0 | 340 |
| $CF_4$ emission, kg/ton-Al | 0 | 1.5-2.5 |

Example 2

Purification of Al Alloy

An anode was prepared for electrorefining. The anode had the composition shown in Table 2.

TABLE 2

Composition of impure aluminum anode

| Element | Atomic % |
| --- | --- |
| Al | 79.77 |
| Si | 11.62 |
| Fe | 0.758 |
| Cu | 5.00 |
| Mn | 0.187 |
| Mg | 0.0619 |
| Cr | 0.0461 |
| Ni | 0.0784 |
| Zn | 2.32 |
| Pb | 0.0713 |

The anode and a copper cathode were weighed and positioned about 2 cm apart in an 50 ml beaker on a hot plate stirrer. An electrolyte of anhydrous $AlCl_3$ and BmimCl was weighed and mixed in the beaker under an inert atmosphere to avoid moisture. The molar ratio of anhydrous $AlCl_3$ to BmimCl was 1.5. Stirring and heating rates were set. When electrolyte temperature was stable at 105° C., a constant cell voltage of 1.0-1.5 volts was applied between anode and cathode, and Al was electrodeposited at the cathode. After the electrolysis, the anode and cathode are taken out of the cell, washed with water and weighed again to measure the respective loss and gain. The anode and cathode were characterized using a micro image analyzer, X-ray diffraction and an optical microscope.

Figure 6:
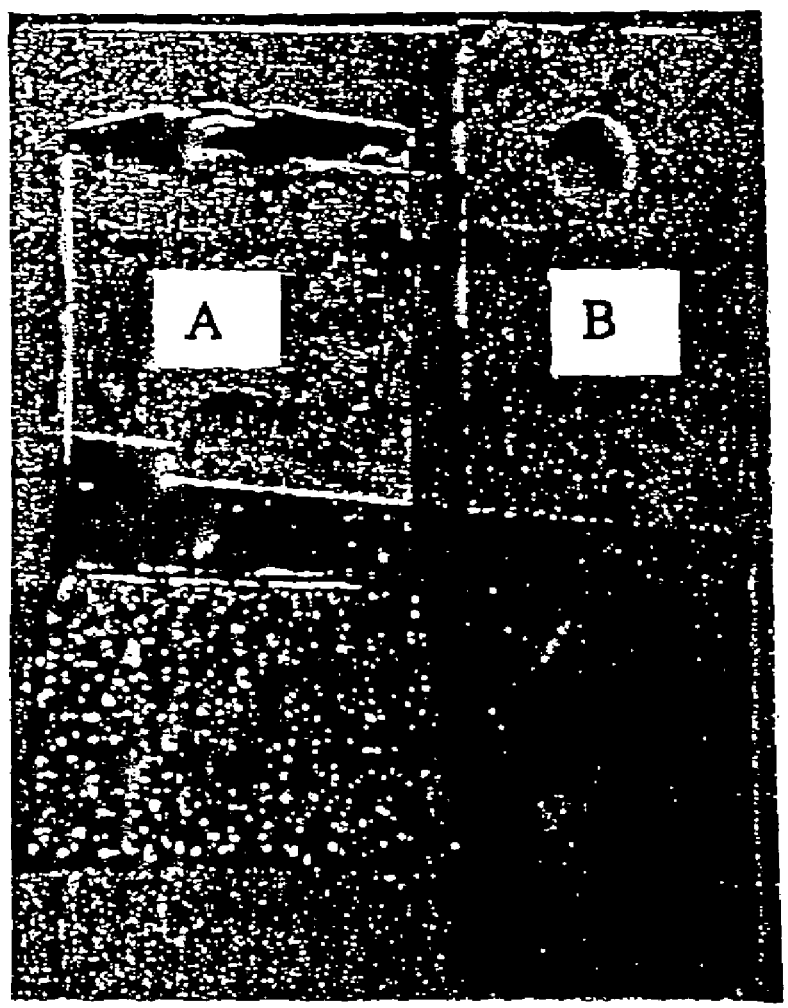
FIG. 6 shows electrodes after electrorefining (cathode=A, anode=B)

FIG. 6 shows the cathode (A) and anode (B) after the electrolysis. Cathode A includes an Al deposit. The aluminum deposit on the cathode A can be divided into two parts: a planar layer adjacent to the cathode A and a dendritic layer on the planar layer. Anode B includes a dark anode residue where the anode B was in the electrolyte and was electrochemically dissolved. The anode residue has a porous structure and was scratched for characterization.

Figure 7:
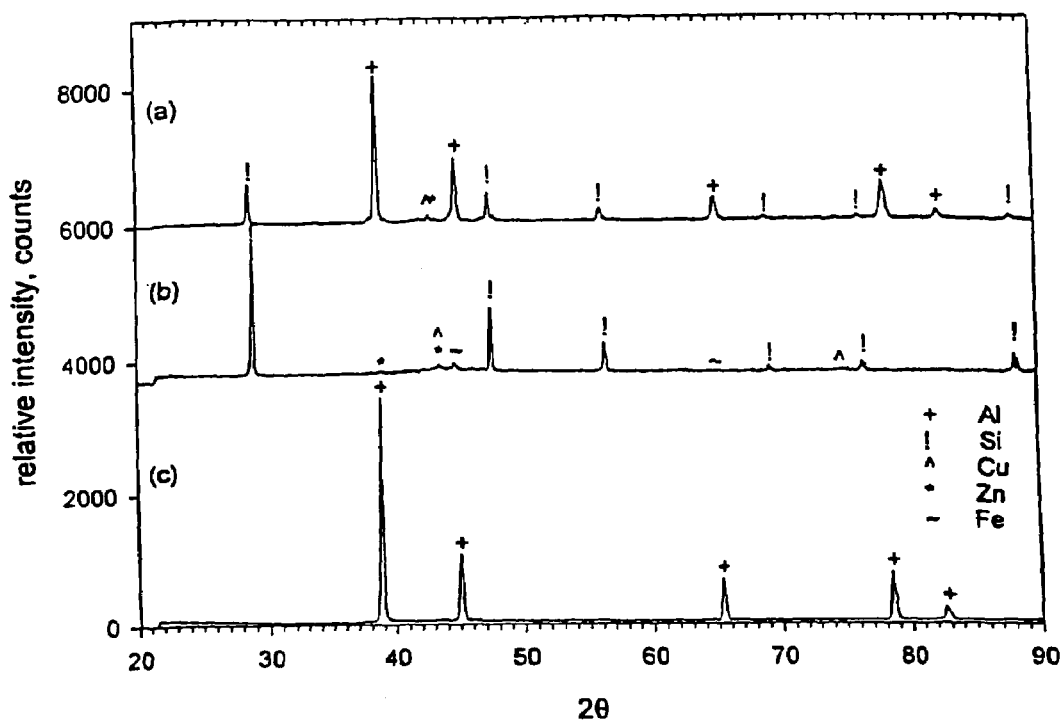
FIG. 7 shows X-ray diffraction patterns of (a) an Al anode before electrorefining, (b) anode residue after refining and (c) electrodeposited Al.

FIG. 7 shows X-ray diffraction patterns taken of (a) the original aluminum anode B, (b) the dark anode residue and (c) the electrodeposited aluminum, after separation from cathode A. Based on X-ray diffraction patterns and spectrometer results, the original anode B contained mainly Al, Si, Cu, Zn and Fe, as shown in X-ray diffraction pattern (a) of FIG. 7. During the electrolysis, the dissolution of each of Al, Si, Cu, Zn and Fe should be dependent on the electrode potential and kinetic conditions. Because Al has a lower potential than Si, Cu, Zn and Fe, thermodynamically Al should be dissolved before the Si, Cu, Zn and Fe. Confirming the dissolution of Al from the anode B before Si, Cu, Zn and Fe, X-ray diffraction pattern (b) of the anode residue includes the diffraction peaks of Si, Cu, Zn and Fe, but not Al. In addition, X-ray diffraction pattern (c) of the cathode deposit includes only the peaks associated with Al, showing that Si, Cu, Zn and Fe were not deposited on the cathode. The Si, Cu, Zn and Fe should remain on the anode B or precipitate to the bottom of the electrolysis cell.

Figure 8:
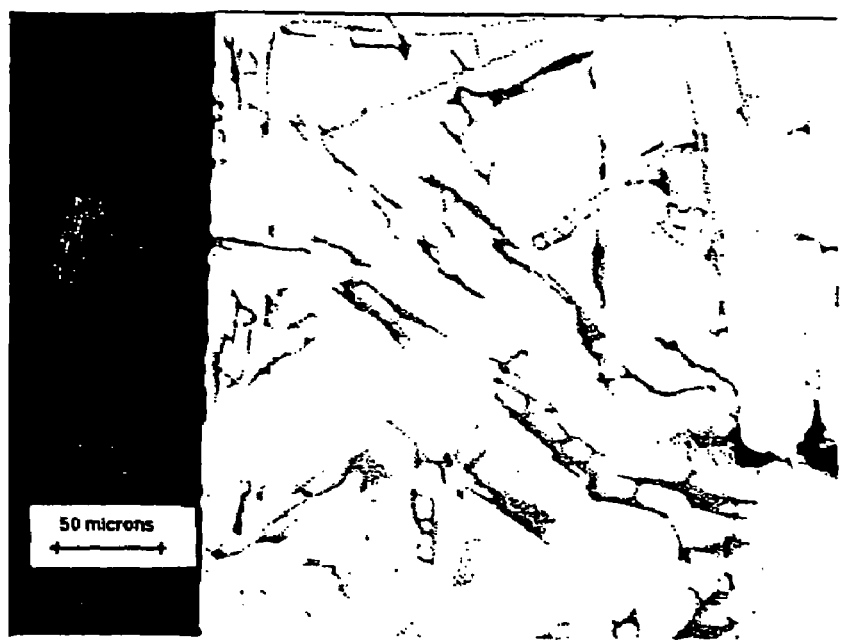
FIG. 8 shows optical micrographs of an anode after electrolysis.
Figure 9:
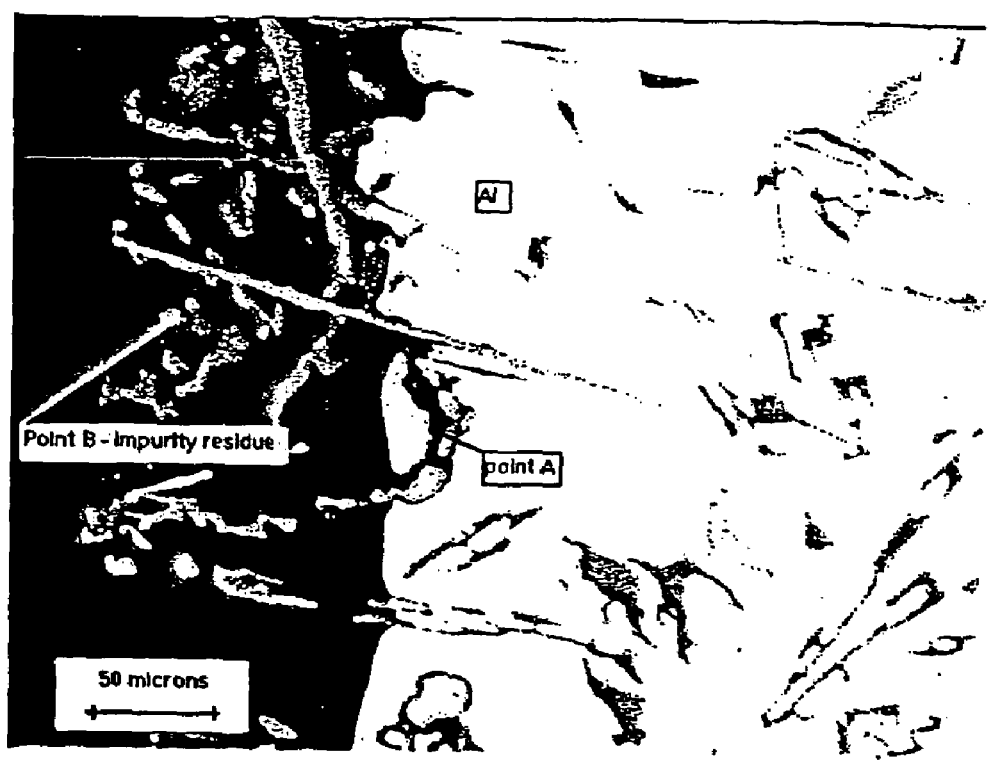
FIG. 9 shows optical micrographs of an anode after electrolysis.

FIGS. 8-9 are optical micrographs of the anode B before and after electrolysis, respectively. The lighter area on each micrograph corresponds to aluminum. The darker area on each micrograph corresponds to impurities. The composition of the different regions of the anode B was determined using an optical microscope. Point B of FIG. 9 shows that impurities did not dissolve during in the electrolysis.

Example 3

Electrolyte Containing 1-butyl-3-methylimidazolium chloride

Electrolytes were made by mixing 0.17 moles of $AlCl_3$ and 0.11 moles of 1-butyl-3-methylimidazolium chloride. An anode and a cathode were placed in the electrolyte. The electrolyte was heated to 100° C. A voltage of 1.5 volts was applied across the anode and cathode. Remarkably, electrodeposition of Al was only observed using a 1-butyl-3-methylimidazolium chloride-$AlCl_3$ ionic liquid. Continuous electrodeposition of Al was not observed using other ionic liquids.

While the present invention has been described with reference to specific embodiments, it is not confined to the specific details set forth, but includes various changes and modifications that may suggest themselves to those skilled in the art, all falling with the scope of the invention as defined by the following claims.

What is claimed is:

1. An electrolysis cell for refining or recycling a metallic element in an anode of the cell, the electrolysis cell comprising
 a cathode including a porous basket and electrically conductive particles held by the porous basket;
 an electrolyte comprising 1-butyl-3-methyl imidazolium chloride and a chloride of the metallic element; a container holding the cathode and the electrolyte; and
 an anode comprising the metallic element to be refined or recycled.

2. The electrolysis cell according to claim 1, wherein the porous basket comprises a material selected from the group consisting of Al, Cu and stainless steel.

3. The electrolysis cell according to claim 1, wherein the electrically conductive particles comprise an element selected from Al and C.

4. The electrolysis cell according to claim 1, wherein the chloride of the metallic element comprises $AlCl_3$.

5. The electrolysis cell according to claim 1, wherein the chloride of the metallic element is a gas.

6. The electrolysis cell according to claim 1, wherein the metallic element is selected from the group consisting of Li, Mg, Al, Ti, Zr and Nd.

7. The electrolysis cell according to claim 1, wherein the porous basket is a mesh or perforated sheet and is sufficiently porous to permit electrolyte and dissolved material from the anode to circulate in the electrolysis cell.

8. The electrolysis cell according to claim 1, wherein the porous basket comprises a metal.

9. The electrolysis cell according to claim 1, wherein the porous basket comprises Al.

10. An electrolysis cell for refining or recycling a metallic element in an anode of the cell, the electrolysis cell comprising
 a cathode including a porous basket and electrically conductive particles held by the porous basket;
 an electrolyte comprising 1-methyl-3-methyl imidazolium chloride, 1-ethyl-3-methyl imidazolium chloride, 1-propyl-3-methyl imidazolium chloride or 1-butyl-3-methyl imidazolium chloride and a chloride of the metallic element; a container holding the cathode and the electrolyte; and
 an anode comprising the metallic element to be refined or recycled.

* * * * *